Patented Jan. 19, 1937

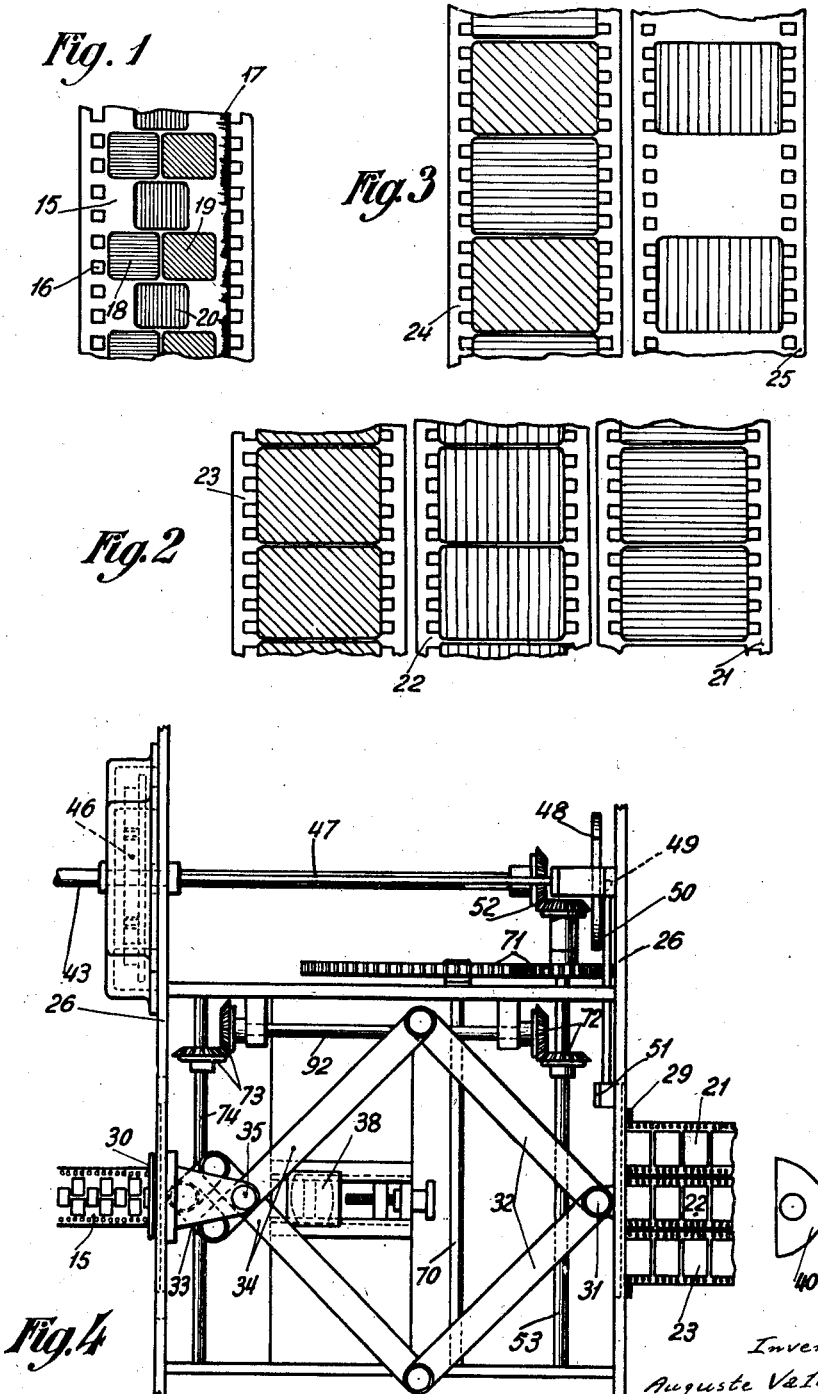

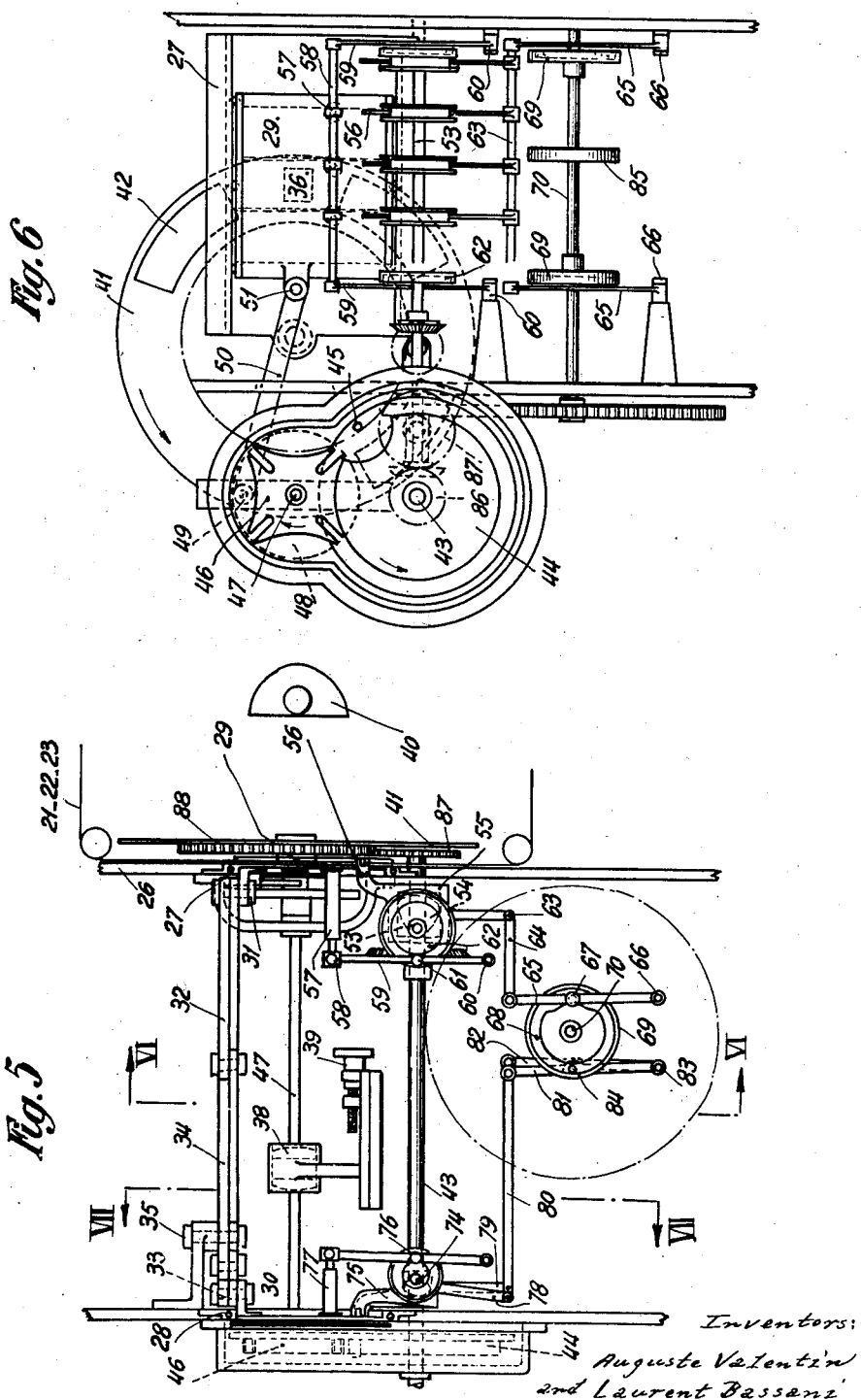

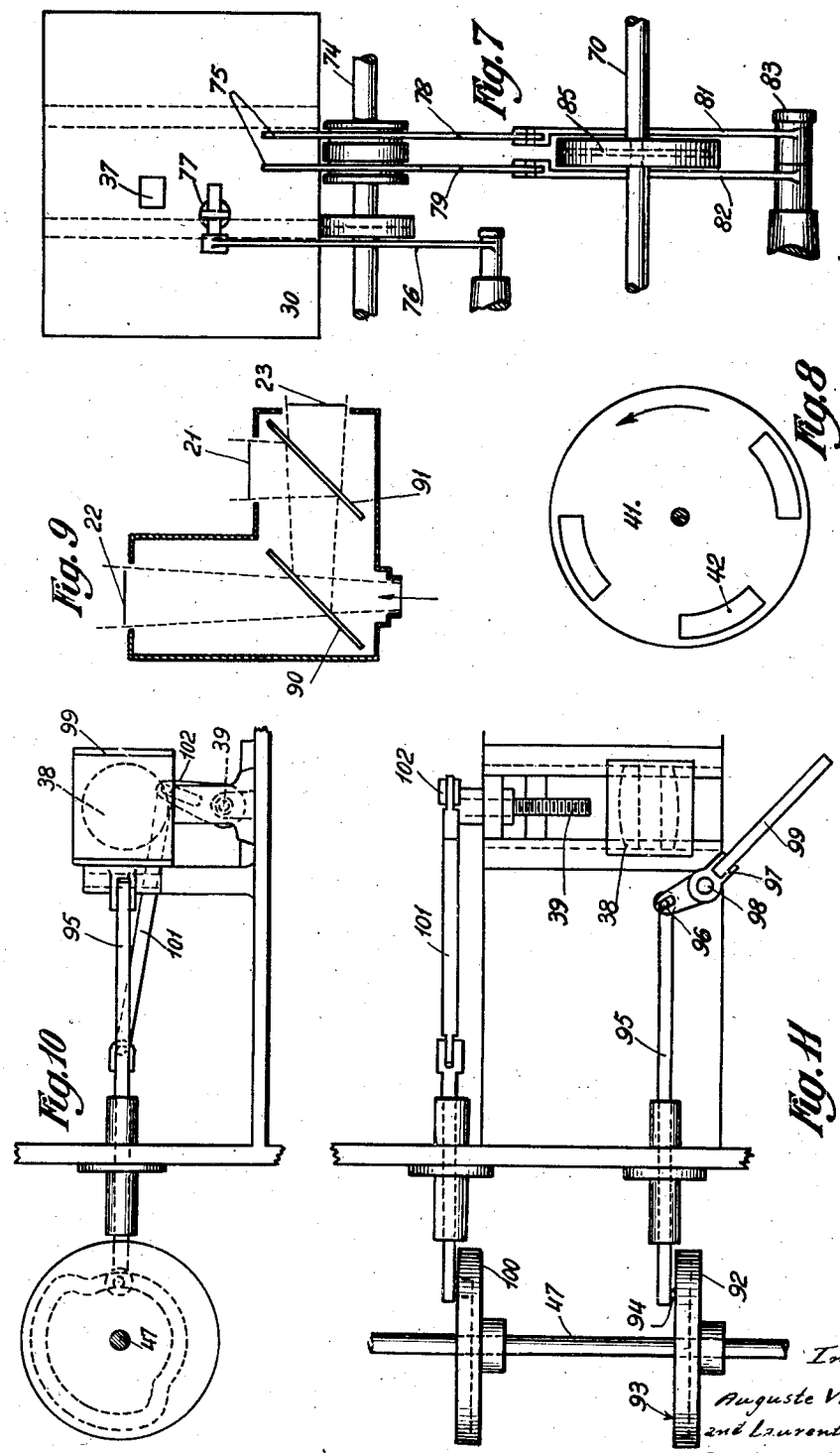

2,068,209

UNITED STATES PATENT OFFICE 2,068,209

APPARATUS FOR OBTAINING FILMS FOR CINEMATOGRAPHIC PROJECTION IN COLORS

Auguste Valentin and Laurent Bassani, Paris, France

Application April 4, 1935, Serial No. 14,698
In France April 14, 1934

2 Claims. (Cl. 88—24)

The present invention relates to printing, by means of one or more negative films, positive films for projection in natural colors by means of three single color views of each picture projected simultaneously and colored respectively in blue, green or red.

Such positive films are known comprising for each picture three single color images of dimensions substantially equal to one-quarter the surface of an image of a normal film in such manner that they may be easily placed on the film in the space of such an image, so that ordinary projection apparatuses may utilize such films without modification in their feed and sound reading mechanism, the optical equipment only needing to be adapted to this particular operation.

It will nevertheless be understood that the projection of such a film on a screen necessitates a surface enlargement factor four times as great as for a film with normal images; it being therefore absolutely indispensable if it is desired to safeguard the clearness of the projection that the texture of the images must be very fine.

Now, whilst the trade is at present able to make such positive films, the emulsion of which is of very fine grain, it is not the same with respect to the very sensitive panchromatic negative films which must be used in the apparatus for taking views. The fact that the single color negative images obtained under these conditions have a comparatively coarse grain necessitates the rejection of printing positive films by direct contact, since then the grain would be reproduced in its natural size on the positive itself even if the emulsion of this latter were of fine grain.

The present invention proposes to solve the problem perfectly without giving rise to the inconveniences above mentioned, and it provides apparatus for obtaining positive films comprising, in the space of one image of normal dimensions, three single color views of reduced surface and fine grain.

This apparatus embodies means for taking on one or more negative films, views in normal dimensions larger than the images of the positive film to be made, and for printing the images thus obtained with reduction, on the positive film. According to the invention, the coarse grain of the negative emulsion is reduced in the same proportions as the images, so that on the projection the grain of the images obtained on the screen is exactly the same as if the views of the positive film were of normal dimensions.

The apparatus embodies a printing device comprising substantially two carriages connected by rods arranged in pantograph method. One of these carriages takes, in one or more passages or channels, the negative film or films, whilst the other carriage only comprises a single channel and takes the positive film.

The apparatus, furthermore, comprises between the carriages, a suitable objective, and beyond the negative film carrying carriage a luminous source of parallel rays located behind a rotating shutter comprising a suitable succession of openings and solid parts. Furthermore, each carriage is provided with members for feeding the films which it takes, these members consisting preferably of gripping devices operated by means of heart cams.

Finally, one of the carriages is arranged to carry out periodical transverse movements by means of a mechanism actuated by a Maltese cross and of such nature as to bring into the optical axis of the system successively the negative images which it carries. The pantograph connection then transmits to the other carriage displacements corresponding exactly but of reduced amplitude.

Other details of arrangements will appear in the following description of one form of construction shown by way of example in the annexed drawings, in which—

Figure 1 shows a portion of the positive film to be obtained;

Figure 2 shows a group of three negative films to be used according to the process of the invention;

Figure 3 shows two negative films combined with a view to a variation of execution of the process;

Figure 4 is a plan view of the principal members of the printing machine, the outer wall being presumed as removed;

Figure 5 is a side elevation of the same members;

Figure 6 shows these members in front elevation, on the line VI—VI of Figure 5;

Figure 7 is a front elevation on a larger scale on the line VII—VII of Figure 5;

Figure 8 is a view on a smaller scale of the rotating shutter;

Figure 9 shows diagrammatically the arrangement of an apparatus for taking negative views;

Figures 10 and 11 show in elevation and in plan a correcting device where the negative has been taken according to Figure 9.

Figure 1 shows at 15 a positive film of normal size termed "standard" with its lateral perforations at 16, and at 17 the sound recording band.

The process according to the invention relates to the well-known positive films comprising, as shown by Figure 1, for each picture to be projected, three single color images 18, 19 and 20 of a surface substantially equal to one-quarter the surface occupied by an image of a normal film in black.

According to the example of Figure 1, the views 18 and 19 are placed side by side, and the view 20 is located below these in the centre, but the position of this view 20 is not necessarily fixed and it could be exactly below one or other of the two views 18 and 19. To form definite ideas, it may be assumed that the view 18 relates to the blue color, the view 19 to the green color, and the view 20 to the red color.

According to the invention, there are used for printing the positive film 15 one or more negative films comprising images of normal dimensions.

Figure 2 shows to this end a group of three films 21, 22, 23 which have been impressed simultaneously or at short intervals, the film 21 by the blue rays, the film 22 by the red, and the film 23 by the green rays.

Figure 3 shows how this same grouping might be obtained by means of two films only, 24 and 25, and it would then be necessary to use an apparatus for taking views which could take on one film only, 24 for example, images given by the green rays and the blue rays. The other film 25 impressed by the red rays, would comprise between the consecutive images intervals of the same height as these latter.

Figure 4 and those following, relate to a printing machine permitting a positive film such as 15 to be obtained by means of three negative films 21, 22 and 23.

This machine comprises a frame 26 forming a dark chamber, and including, suitably guided in horizontal slides such as 27 and 28 (Figure 5), two carriages of which one, 29, has three vertical channels for the passage of the films 21, 22, 23, whilst the other carriage 30 comprises only one vertical channel to take the positive film 15.

The two carriages are connected by a hinged system of the pantograph type, that is to say, the carriage 29 comprises hinged to it at 31, two connecting rods 32 which are attached to two connecting rods 33, shorter, and hinged in the same way to the carriage 30; this connection between the rods 32 and 33 being ensured by a scissor arrangement 34, the pivoting axis 35 of which is fixed to the frame 26.

Owing to this arrangement, it will be understood that when the carriage 29 carries out movements in the slide 27, the carriage 30 moves in the opposite direction in the slide 28 and with a smaller amplitude.

The ratio of reduction of the movements of the carriage 30 is equal to the ratio between the distance of the axes of the three films 21, 22 and 23, and the distance of the axes of the three images 18, 19 and 20 of the positive film 15.

Close to the carriages 29 and 30 the frame comprises apertures 36 and 37 for the passage of the luminous rays in the course of the printing operations.

The optical portion of the machine comprises an objective 38 of which there is shown at 39 the focussing screw. Furthermore, beyond the carriage 29 is arranged at a suitable distance, an intense luminous source 40 and between this source and the carriage 29 is arranged a rotating disc 41 (Figures 5 and 8) which comprises, according to the example shown, three apertures such as 42 each extending over an angle of 45° with intervals of the same amplitude.

The mechanical portion of the machine comprises members for the periodical displacement of the carriage 29, the members for the vertical feed of the film and members which place the shutter disc 41 in rotation.

The members for placing the carriage 29 in movement comprise a motor spindle 43 operated by any suitable motor, and on which is keyed a plate 44 of mechanism well known under the name of a "Maltese cross", that is to say, comprising a pin 45 which cooperates at each revolution with a kind of pinion gear 46 in the form of a Maltese cross, so that at the end of each revolution of the plate 44 the cross 46 carries out a quarter of a revolution and this very rapidly, then remaining fixed whilst the plate 44 carries out the following rotation.

The maltese cross 46 drives a spindle 47 on which is keyed a crank plate 48 and on the crank 49 of which is hinged a connecting rod 50 attached at the other end, at 51, to the carriage 29.

The eccentricity of the crank 49 is calculated so that a quarter turn of the crank plate 48 produces a displacement of the carriage 29 equal to the distance separating the two axes of two consecutive films 21, 22 or 23. According to the position which is shown in the figures, the axis of the central film 22 is on the general optical axis of the system formed by the luminous source 40, the aperture 36, the objective 38 and the aperture 37.

It will be understood that each revolution of the disc 44 thus produces a single displacement of the carriage 29, these displacements being separated by intervals of time during which the parts remain absolutely fixed.

The members which ensure the movements of the three negative films 21, 22 and 23 are also controlled by a motor spindle 43 which actuates to this end, through the intermediary of bevel pinions 52, a spindle 53 on which are keyed four heart cams such as 54 each carried in a rectangular cage 55 which forms a gripping device 56 adapted to be placed in engagement in the perforations which surround the images of the films 21, 22 and 23.

Each of the four gripping devices 56 is completed by a counter grip 57 carried by the carriage 29 and the role of which is to hold the film fixed during the whole time when the gripping device 56 is not in the perforations of the said film.

Such a method of feed by means of gripping devices accompanied by counter grips is for the rest well known, and in the present case the counter grips 57 have their end eyelets arranged on a pin 58 parallel to the slides 27, so that the counter grips 57 can slide on this pin when the carriage 29 is moved.

The pin 58 is carried by levers such as 59 hinged on axes 60 of the frame. These levers comprise sliding pieces 61 engaging in eccentric grooves formed in the discs 62 fixed on the spindle 53 of the heart cams.

It is useless to describe the operation of the gripping devices and the counter grips just mentioned for these are usual arrangements in the practice of constructing apparatus either for taking views or for the projection of cinematographic films.

In the same way, known devices are provided so that a a certain moment the gripping devices 56 are moved away from the plane of the films 21, 22 and 23, so that their movements take place idly and the films remain fixed.

To this end, the foot of each cage 55 is hinged to a common pin 63 carried by the intermediary of connecting rods 64 by two levers 65 hinged about axes such as 66, of the frame.

These levers each comprise a sliding piece 67 engaging in the groove 68 of a disc 69 fixed on a spindle 70 which obtains its movement as shown by Figure 4, from the spindle 53 through the intermediation of a reducing gear 71.

The same arrangement of gripping devices, counter grips and removing levers is reproduced for the carriage 30 and to this end the spindle 53 actuates through the intermediary of bevel pinions 72 and 73 and a spindle 92, a spindle 74 parallel to the spindle 53 and which carries the heart cams of two gripping devices 75 and the plate with eccentric grooves 76 of a counter grip 77.

In the same order of ideas as previously, the two gripping devices 75 are terminated by two tail pieces 78 and 79 connected separately by a rod such as 80 to two levers 81 and 82 hinged about an axis 83 of the frame.

The levers 81 and 82 comprise two sliding pieces such as 84 which engage in the suitably eccentric grooves comprised by a plate 85 keyed on the spindle 70 described above. The members driving the shutter disc 41 consist simply in a pinion 86 (Figure 6) keyed on the spindle 43 and engaging with a second pinion 87 which itself engages with a toothed wheel 88 integral with the disc 41. These gears are so calculated that the disc 41 rotates four times as slowly as the spindle 43. It therefore rotates at the same mean speed as the spindle 47 of the Maltese cross, but its movement is continuous whilst that of the spindle 47 is intermittent.

The operation of the mechanism just described is as follows:—

Starting from the position shown on the figures, the printing of an image on the film 22 has just been effected, and the movement of the rotary members continuing in the sense of the arrows of Figure 6 it will be seen that the Maltese cross 46 in rotating by a quarter of a turn in clockwise direction will thrust the carriage 29 so as to bring the axis of the film 21 into the optical axis of the system.

By the movement of the pantograph 32, 33 and 34, the space 18 of the positive film 15 is itself placed in the optical axis and immediately after this displacement the Maltese cross 46 and the two carriages 29 and 30 are held fixed, but by the operation of the heart cams keyed on the spindle 74 rotating continually, the gripping devices 75 cause the positive film to descend.

During this time, the heart cams 54 whilst causing the gripping devices 56 to rise and descend, the pivoting axis 63 of these gripping devices has been thrust forward by the shape of the groove 68, so that these gripping devices move idly.

After this descent of the positive film, the gripping devices 75 are separated by the action of the levers 81 and 82 and also move idly. But during this cycle, the shutter disc 41 has rotated sufficiently for one of the apertures 42 to come into the optical axis in such manner that the photograph of the image of the film 21 takes place. This constitutes the first operating period.

On the following revolution of the motor spindle 43 the Maltese cross 46 brings the film 22 into the optical axis, the gripping devices 56 and 75 are still out of action and the shutter disc 41 presents only a solid part and does not allow any photograph to be taken, this constitutes the second cycle.

On the following rotation of the spindle 43, the carriage 29 is drawn to the limit towards the left of Figure 6, so that it is the film 23 which is in the optical axis at the same time as the space 19 of the positive film 15.

The gripping devices 55 and 65 are still out of action, but the disc 41 soon brings an aperture 42 into the optical axis which permits the photographing of the image of the film 23.

The cycle following the operation (fourth cycle) brings the centre of the carriage 29 and consequently that of the carriage 30 into the optical axis (Figure 4). The gripping devices 56 and 75 are simultaneously placed in action and the four films 21, 22, 23, and 15, descend by the amount corresponding to an image. The gripping devices 56 and 75 then move away and the photographing of the image 22 on the space 20 of the film 15 takes place.

It is evident that whilst the gripping devices 56 and 75 are out of action, the counter grips 57 and 77 are engaged in the perforations of the various films and hold these absolutely fixed.

The simple method of operation which has just been described is applicable where the views of the three films 21, 22 and 23, have been taken under the same conditions, even if there are apparatus for taking views based on the diagram of Figure 9 according to which it is seen that the film 22 is impressed through an uncolored glass 90 inclined at 45° and in the same way the film 23 is impressed by rays which, having been reflected by the glass 90, pass through another glass 91 inclined at an angle of 45°. Finally, the film 21 is impressed by rays which, although having undergone two successive reflections, do not pass through any glass.

It is known that luminous rays passing through a glass having parallel faces are not deviated in their directions but this is shifted parallel to itself as can be seen by examining Figure 9.

But since the beam under consideration is diverging, the various rays of this beam do not strike this glass with the same incidence and it follows that the image obtained through a glass is slightly expanded.

This deformation is quite imperceptible to the eye, but it is sufficient to prevent the images of the films 22 or 23 being superposed with the images of the other film.

In order to permit a positive film being obtained, the three images of each picture of which are adapted to be exactly superposed, the invention provides for the addition to the machine which has just been described, of a compensator shown in Figures 10 and 11, and according to which there is keyed on the spindle 47 of the Maltese cross 46 a plate 92 comprising a groove 93 in which engages the sliding block 94 of a connecting rod 95, the other extremity of which is hinged at 96 to a support 97 adapted to pivot about a vertical axis 98.

The support 96 carries a glass with parallel faces and of suitable dimensions; thus, at the moment of printing each image of the film 21, the glass 99 will be situated at an angle of 45° to the trajectory of the luminous beam, so that the differences presented by the image of the film 21 with respect to those of the other films, are compensated.

During the remainder of the time, owing to the action of the groove 93, the glass 99 is removed from the beam of luminous rays which pass through the objective 38.

Nevertheless, this periodic interposing of a glass such as 99 necessitates a rectification of the focusing of the objective, and there is shown in Figure 11 also that a second plate 100 similar to the plate 92 acts in the same manner on a connecting rod 101 which, through the intermediation of a crank 102, causes the rotation by the amount exactly desired, of the screw 39, which rectifies the focusing.

Naturally, the device of Figures 10 and 11 is only applicable in the case where the negative films have been impressed in an apparatus according to Figure 9, but by proceeding in a manner similar to that which has led to the production of the device according to Figures 10 and 11, it is possible without any difficulty to adapt the machine to taking positives by means of the negatives produced by no matter what type of photographic apparatus. It will be furthermore understood that if the views have been taken on two negatives only, as those of Figure 3, it will be sufficient to give to the various grooves comprised by the plates of the printing machine, the necessary profile and by modifying as required the ratio of certain gearings, the machine will be adapted without difficulty to the printing of the two films 24 and 25; and even if the images were only on a single negative film, it would be still possible by suppressing two of the three conduits of the carriage 29 to cause the machine to operate to obtain a positive of the nature of the film 15. The general extent which can be given to the process and to the machine which constitute the present invention, will thus be apparent.

We claim:—

1. A printing machine comprising a carriage for negative films, a carriage for a positive film, a fixed objective situated between said carriages, means for displacing one of said carriages, means for connecting said carriages, said means comprising levers with unequal arms articulated together and forming two parallelograms having a common summit and respectively attached by their opposite summits to said carriages.

2. A printing machine comprising a carriage for negative films, a carriage for a positive film, a fixed objective situated between said carriages, levers with unequal arms articulated together and forming parallelograms having a common summit and attached to the carriages by opposed summits, means for displacing the carriages, means for displacing the film in the carriages, and means mechanically connecting the carriage-displacing means and the film-displacing means.

AUGUSTE VALENTIN.
LAURENT BASSANI.